United States Patent
Sloane

(10) Patent No.: US 11,601,418 B2
(45) Date of Patent: Mar. 7, 2023

(54) SYSTEM FOR INCREASING AUTHENTICATION COMPLEXITY FOR ACCESS TO ONLINE SYSTEMS

(71) Applicant: BANK OF AMERICA CORPORATION, Charlotte, NC (US)

(72) Inventor: Brandon Sloane, Santa Barbara, CA (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 234 days.

(21) Appl. No.: 17/070,457

(22) Filed: Oct. 14, 2020

(65) Prior Publication Data

US 2022/0116380 A1 Apr. 14, 2022

(51) Int. Cl.
*H04L 29/06* (2006.01)
*H04L 9/40* (2022.01)
*H04L 69/22* (2022.01)

(52) U.S. Cl.
CPC ........ *H04L 63/083* (2013.01); *H04L 63/0884* (2013.01); *H04L 63/105* (2013.01); *H04L 69/22* (2013.01)

(58) Field of Classification Search
CPC . H04L 63/083; H04L 63/0884; H04L 63/105; H04L 69/22; H04L 2463/082
USPC .......................................................... 726/6
See application file for complete search history.

(56) References Cited

U.S. PATENT DOCUMENTS

| | | |
|---|---|---|
| 8,316,237 B1 | 11/2012 | Felsher et al. |
| 8,661,507 B1 | 2/2014 | Hesselink et al. |
| 8,826,371 B2 | 9/2014 | Webb et al. |
| 8,880,435 B1 | 11/2014 | Catlett et al. |
| 9,087,319 B2 | 7/2015 | Nguyen |
| 9,294,445 B2 | 3/2016 | OHare et al. |
| 9,397,988 B2 | 7/2016 | Pravetz et al. |
| 9,444,824 B1 | 9/2016 | Balazs et al. |
| 9,491,201 B2 | 11/2016 | Bagepalli et al. |
| 9,626,502 B2 | 4/2017 | Smith et al. |
| 9,734,169 B2 | 8/2017 | Redlich et al. |
| 9,825,933 B2 | 11/2017 | Clothier et al. |
| 9,864,851 B2 * | 1/2018 | Adams .................... H04L 63/06 |

(Continued)

OTHER PUBLICATIONS

Password Security through Negative Filtering, Dasgupta e tal, Sep. 2010 (Year: 2010).*

*Primary Examiner* — Jahangir Kabir
(74) *Attorney, Agent, or Firm* — Moore & Van Allen PLLC; Seongun M. Hong

(57) ABSTRACT

A system is provided for increasing authentication complexity for access to online systems. In particular, the system may use a hidden or obscured method for creating and enforcing a multi-factor authentication scheme. In this regard, the system may introduce authentication logic to a particular application in the network environment such that one or more "invalid" login credentials are generated by a local agent using a pre-shared key and/or algorithm. A back-end authentication system may be calculate its own set of "invalid" login credentials based on the same pre-shared key and/or algorithm, then subsequently compare the calculated incorrect credentials with the incorrect login credentials received from the local agent. If a match is detected, the system may permit a valid set of authentication credentials to be provided to authorize access to the target application and/or online system.

20 Claims, 2 Drawing Sheets

(56) References Cited

U.S. PATENT DOCUMENTS

| | | |
|---|---|---|
| 9,948,648 B1 | 4/2018 | King-Britton |
| 10,073,979 B2 | 9/2018 | Von Kaenel et al. |
| 10,110,578 B1 | 10/2018 | Baer et al. |
| 10,205,737 B2 | 2/2019 | Chen et al. |
| 10,225,283 B2 | 3/2019 | Mathew et al. |
| 10,237,070 B2 | 3/2019 | Lindemann |
| 10,289,835 B1* | 5/2019 | Machani ............... H04L 9/0894 |
| 10,313,317 B2* | 6/2019 | O'Regan ............... H04L 63/083 |
| 2009/0013390 A1* | 1/2009 | Li .......................... G06F 21/34 726/6 |
| 2013/0198836 A1* | 8/2013 | Wuellner ................ G06F 21/32 726/19 |
| 2014/0351586 A1 | 11/2014 | Hook et al. |
| 2015/0188949 A1 | 7/2015 | Mahaffey et al. |
| 2016/0132401 A1 | 5/2016 | OHare et al. |
| 2016/0269181 A1* | 9/2016 | Hon ...................... H04L 9/3228 |
| 2016/0337344 A1* | 11/2016 | Johansson ........... H04L 63/0281 |
| 2018/0205725 A1 | 7/2018 | Cronkright et al. |

\* cited by examiner

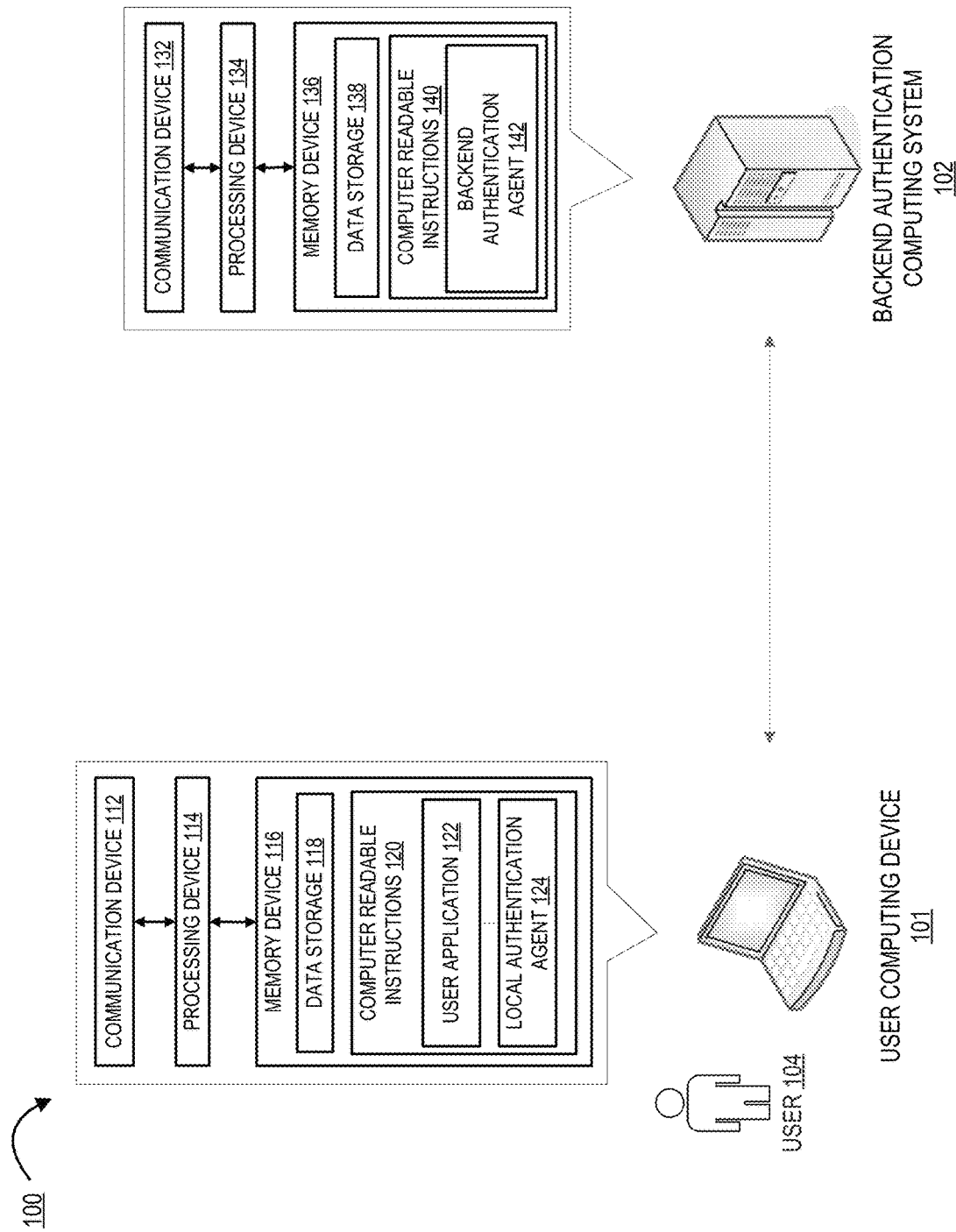

200

```
┌─────────────────────────────────────────────────────────────┐
│ DETECT ONE OR MORE AUTHENTICATION REQUESTS FROM A USER, THE │
│ ONE OR MORE AUTHENTICATION REQUESTS COMPRISING A SET OF     │
│ VALID AUTHENTICATION CREDENTIALS ASSOCIATED WITH A USER     │
│ APPLICATION                                                  │
│ 201                                                          │
└─────────────────────────────────────────────────────────────┘
                              ↓
┌─────────────────────────────────────────────────────────────┐
│ BASED ON THE ONE OR MORE AUTHENTICATION REQUESTS, GENERATE  │
│ ONE OR MORE RANDOMIZED STRINGS ASSOCIATED WITH THE ONE OR   │
│ MORE AUTHENTICATION REQUESTS                                │
│ 202                                                          │
└─────────────────────────────────────────────────────────────┘
                              ↓
┌─────────────────────────────────────────────────────────────┐
│ GENERATE, BY A LOCAL AUTHENTICATION AGENT USING THE ONE OR  │
│ MORE RANDOMIZED STRINGS AND A PRE-SHARED ALGORITHM, ONE OR  │
│ MORE SETS OF INVALID AUTHENTICATION CREDENTIALS             │
│ 203                                                          │
└─────────────────────────────────────────────────────────────┘
                              ↓
┌─────────────────────────────────────────────────────────────┐
│ INPUT THE ONE OR MORE SETS OF INVALID AUTHENTICATION        │
│ CREDENTIALS TO THE USER APPLICATION                          │
│ 204                                                          │
└─────────────────────────────────────────────────────────────┘
                              ↓
┌─────────────────────────────────────────────────────────────┐
│ RECEIVE, THROUGH A BACKEND AUTHENTICATION AGENT, THE ONE OR │
│ MORE SETS OF INVALID AUTHENTICATION CREDENTIALS FROM THE    │
│ USER APPLICATION                                             │
│ 205                                                          │
└─────────────────────────────────────────────────────────────┘
                              ↓
┌─────────────────────────────────────────────────────────────┐
│ GENERATE, BY THE BACKEND AUTHENTICATION AGENT USING THE ONE │
│ OR MORE RANDOMIZED STRINGS AND THE PRE-SHARED ALGORITHM,    │
│ ONE OR MORE BACKEND COPIES OF THE ONE OR MORE SETS OF       │
│ INVALID AUTHENTICATION CREDENTIALS                           │
│ 206                                                          │
└─────────────────────────────────────────────────────────────┘
                              ↓
┌─────────────────────────────────────────────────────────────┐
│ PERFORM AUTHENTICATION OF THE USER BASED ON COMPARING THE   │
│ ONE OR MORE SETS OF INVALID AUTHENTICATION CREDENTIALS WITH │
│ THE ONE OR MORE BACKEND COPIES OF THE ONE OR MORE SETS OF   │
│ INVALID AUTHENTICATION CREDENTIALS                           │
│ 207                                                          │
└─────────────────────────────────────────────────────────────┘
```

FIG. 2

SYSTEM FOR INCREASING AUTHENTICATION COMPLEXITY FOR ACCESS TO ONLINE SYSTEMS

FIELD OF THE INVENTION

The present disclosure embraces a system for increasing authentication complexity for access to online systems.

BACKGROUND

There is a need for a way to implement authentication systems with increased authentication credential complexity.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for increasing authentication complexity for access to online systems. In particular, the system may use a hidden or obscured method for creating and enforcing a multi-factor authentication scheme. In this regard, the system may introduce authentication logic to a particular application in the network environment such that one or more "invalid" login credentials are generated by a local agent using a pre-shared key and/or algorithm. A back-end authentication system may be calculate its own set of "invalid" login credentials based on the same pre-shared key and/or algorithm, then subsequently compare the calculated incorrect credentials with the incorrect login credentials received from the local agent. If a match is detected, the system may permit a valid set of authentication credentials to be provided to authorize access to the target application and/or online system.

Accordingly, embodiments of the present disclosure provide a system for increasing authentication complexity for access to online systems. The system may comprise a memory device with computer-readable program code stored thereon; a communication device; and a processing device operatively coupled to the memory device and the communication device. The processing device may be configured to execute the computer-readable program code to detect one or more authentication requests from a user, the one or more authentication requests comprising a set of valid authentication credentials associated with a user application; based on the one or more authentication requests, generate one or more randomized strings associated with the one or more authentication requests; generate, by a local authentication agent using the one or more randomized strings and a pre-shared algorithm, one or more sets of invalid authentication credentials; input the one or more sets of invalid authentication credentials to the user application; receive, through a backend authentication agent, the one or more sets of invalid authentication credentials from the user application; generate, by the backend authentication agent using the one or more randomized strings and the pre-shared algorithm, one or more backend copies of the one or more sets of invalid authentication credentials; and perform authentication of the user based on comparing the one or more sets of invalid authentication credentials with the one or more backend copies of the one or more sets of invalid authentication credentials.

In some embodiments, performing authentication of the user comprises detecting that the one or more sets of invalid authentication credentials match the one or more backend copies of the one or more sets of invalid authentication credentials; and triggering an authentication pass, wherein the authentication pass causes the local authentication agent to pass the set of valid authentication credentials to the user application.

In some embodiments, performing authentication of the user comprises detecting that the one or more sets of invalid authentication credentials do not match the one or more backend copies of the one or more sets of invalid authentication credentials; and preventing an authentication pass from being triggered.

In some embodiments, the one or more sets of invalid authentication credentials comprises a first set of invalid authentication credentials and a second set of invalid authentication credentials, wherein the one or more backend copies of the one or more sets of invalid authentication credentials comprises a backend copy of the first set of invalid authentication credentials and a backend copy of the second set of invalid authentication credentials, wherein performing authentication of the user comprises detecting that the first set of invalid authentication credentials matches the backend copy of the first set of invalid authentication credentials; detecting that the second set of invalid authentication credentials matches the backend copy of the second set of invalid authentication credentials; and triggering an authentication pass, wherein the authentication pass causes the local authentication agent to pass the set of valid authentication credentials to the user application.

In some embodiments, the local authentication agent is integrated into the user application.

In some embodiments, the one or more randomized strings are embedded in header information of the one or more authentication requests.

In some embodiments, the set of valid authentication credentials comprises a username and password.

Embodiments of the present disclosure also provide a computer program product for increasing authentication complexity for access to online systems, the computer program product comprising at least one non-transitory computer readable medium having computer-readable program code portions embodied therein. The computer-readable program code portions may comprise executable code portions for detecting one or more authentication requests from a user, the one or more authentication requests comprising a set of valid authentication credentials associated with a user application; based on the one or more authentication requests, generating one or more randomized strings associated with the one or more authentication requests; generating, by a local authentication agent using the one or more randomized strings and a pre-shared algorithm, one or more sets of invalid authentication credentials; inputting the one or more sets of invalid authentication credentials to the user application; receiving, through a backend authentication agent, the one or more sets of invalid authentication credentials from the user application; generating, by the backend authentication agent using the one or more randomized strings and the pre-shared algorithm, one or more backend copies of the one or more sets of invalid authentication credentials; and performing authentication of the user based on comparing the one or more sets of invalid authentication credentials with the one or more backend copies of the one or more sets of invalid authentication credentials.

In some embodiments, performing authentication of the user comprises detecting that the one or more sets of invalid authentication credentials match the one or more backend copies of the one or more sets of invalid authentication credentials; and triggering an authentication pass, wherein the authentication pass causes the local authentication agent to pass the set of valid authentication credentials to the user application.

In some embodiments, performing authentication of the user comprises detecting that the one or more sets of invalid authentication credentials do not match the one or more backend copies of the one or more sets of invalid authentication credentials; and preventing an authentication pass from being triggered.

In some embodiments, the one or more sets of invalid authentication credentials comprises a first set of invalid authentication credentials and a second set of invalid authentication credentials, wherein the one or more backend copies of the one or more sets of invalid authentication credentials comprises a backend copy of the first set of invalid authentication credentials and a backend copy of the second set of invalid authentication credentials, wherein performing authentication of the user comprises detecting that the first set of invalid authentication credentials matches the backend copy of the first set of invalid authentication credentials; detecting that the second set of invalid authentication credentials matches the backend copy of the second set of invalid authentication credentials; and triggering an authentication pass, wherein the authentication pass causes the local authentication agent to pass the set of valid authentication credentials to the user application.

In some embodiments, the local authentication agent is integrated into the user application.

In some embodiments, the one or more randomized strings are embedded in header information of the one or more authentication requests.

Embodiments of the present disclosure also provide a computer-implemented method for increasing authentication complexity for access to online systems. The computer-implemented method may comprise detecting one or more authentication requests from a user, the one or more authentication requests comprising a set of valid authentication credentials associated with a user application; based on the one or more authentication requests, generating one or more randomized strings associated with the one or more authentication requests; generating, by a local authentication agent using the one or more randomized strings and a pre-shared algorithm, one or more sets of invalid authentication credentials; inputting the one or more sets of invalid authentication credentials to the user application; receiving, through a backend authentication agent, the one or more sets of invalid authentication credentials from the user application; generating, by the backend authentication agent using the one or more randomized strings and the pre-shared algorithm, one or more backend copies of the one or more sets of invalid authentication credentials; and performing authentication of the user based on comparing the one or more sets of invalid authentication credentials with the one or more backend copies of the one or more sets of invalid authentication credentials.

In some embodiments, performing authentication of the user comprises detecting that the one or more sets of invalid authentication credentials match the one or more backend copies of the one or more sets of invalid authentication credentials; and triggering an authentication pass, wherein the authentication pass causes the local authentication agent to pass the set of valid authentication credentials to the user application.

In some embodiments, performing authentication of the user comprises detecting that the one or more sets of invalid authentication credentials do not match the one or more backend copies of the one or more sets of invalid authentication credentials; and preventing an authentication pass from being triggered.

In some embodiments, the one or more sets of invalid authentication credentials comprises a first set of invalid authentication credentials and a second set of invalid authentication credentials, wherein the one or more backend copies of the one or more sets of invalid authentication credentials comprises a backend copy of the first set of invalid authentication credentials and a backend copy of the second set of invalid authentication credentials, wherein performing authentication of the user comprises detecting that the first set of invalid authentication credentials matches the backend copy of the first set of invalid authentication credentials; detecting that the second set of invalid authentication credentials matches the backend copy of the second set of invalid authentication credentials; and triggering an authentication pass, wherein the authentication pass causes the local authentication agent to pass the set of valid authentication credentials to the user application.

In some embodiments, the local authentication agent is integrated into the user application.

In some embodiments, the one or more randomized strings are embedded in header information of the one or more authentication requests.

In some embodiments, the set of valid authentication credentials comprises a username and password.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

FIG. 1 illustrates an operating environment for the authentication requirement extension system, in accordance with one embodiment of the present disclosure; and FIG. 2 illustrates a process flow for increasing authentication credential complexity using generated invalid login credentials, in accordance with some embodiments of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Resource" as used herein may refer to physical and virtual objects and/or processes used to accomplish the entity's objectives. In this regard, "resource" may refer to applications, data files, computing systems and/or hardware, computing resources (e.g., processing power, memory space, or the like), computing functions, or the like.

"Cryptographic hash function" or "hash algorithm" as used herein may refer to a set of logical and/or mathematical operations or processes that may be executed on a specified segment of data to produce a hash output. Given a specified data input, the hash algorithm may produce a cryptographic hash output value which is a fixed-length character string. Examples of such hash algorithms may include MD5, Secure Hash Algorithm/SHA, or the like. According, "hashing" or "hashed" as used herein may refer to the process of producing a hash output based on a data input into a hash algorithm.

"Key" or "cryptographic key" as used herein may refer to data (e.g., a character string) which determines the manner in which an input is transformed into an output using a cryptographic algorithm (e.g., an encryption algorithm). Accordingly, "symmetric cryptography" or "symmetric key cryptography" may refer to a process for data encryption by which multiple users and/or devices use the same key to encrypt communications.

"Public-key cryptography" or "asymmetric cryptography" may refer to a process for data encryption and/or verification by which a pair of asymmetric corresponding cryptographic keys are generated (e.g., a "key pair" comprising a "public key" intended to be distributed and a "private key" intended to be possessed by a single user or device). Data encrypted using a public key may be decrypted only by the possessor of the corresponding private key. Furthermore, data signed with a private key may be validated by the possessor of the corresponding public key to verify the identity of the signer (which may be referred to herein as "digital signing").

Increasing authentication credential complexity may be a implemented for applications and/or systems within a network environment in order to mitigate the possibility of unauthorized access to such applications, systems, and/or data. For instance, the network may require that user passwords meet certain complexity requirements, such as password length, use of certain characters (e.g., upper and/or lowercase letters, numbers, special characters, and the like), limitations on predictable elements (e.g., restrictions on using birthdates, names, predictable and/or repeating sequences such as 123, 111, or the like), That said, certain legacy computing systems may not be capable of implementing such complexity requirements. For instance, certain legacy systems may not be configured to accept special characters as part of a password or may not support password lengths over a specified character limit.

In this regard, the system as described herein may provide a way to improve the security of a network by using multi-factor authentication to prevent unauthorized access to applications, systems, and/or data on legacy systems as well as non-legacy systems in the network environment. In particular, the system may comprise an authentication agent (e.g., an application and/or application comprising authentication logic) that may monitor certain applications (e.g., legacy applications) for authentication attempts. In some embodiments, the authentication agent may be a local authentication agent which may be integrated into the application. In other embodiments, the authentication agent may be a backend authentication agent which may be a component of a federated sign-on infrastructure. In yet other embodiments, the system may comprise multiple authentication agents (e.g., a local authentication agent which is integrated into the target application and a backend authentication agent that may communicate with the local authentication agent).

The authentication agent may receive multiple sets of authentication credentials over multiple login attempts. Accordingly, the authentication agent may be configured to validate the sequence of authentication credentials before recognizing the authentication attempt as valid. For example, the authentication agent may be configured to require three sets of authentication credentials to be provided over three login attempts, where the first two sets of authentication credentials are specifically generated invalid credentials and the third and final set of authentication credentials are the valid credentials. The authentication agent may evaluate the full sequence (e.g., three sets) of authentication credentials and authorize access to the application only if each of the three sets of authentication credentials match expected values for said credentials as calculated by the authentication agent.

An exemplary embodiment is provided for illustrative purposes. In one embodiment, the system may comprise a local authentication agent which may be integrated into a particular legacy application (e.g., an account management application) that may be configured to authorize user access based on receiving valid authentication credentials for the user. When a user attempts to log onto the application (e.g., by providing user authentication credentials such as a username and password), a randomized string (e.g., a string of numbers) may be provided to the local authentication agent. In some embodiments, the randomized string may be embedded in header information such that the string is not visible to the user. Based on the randomized string, the local authentication agent may use a pre-shared key and/or algorithm to generate a set of invalid authentication credentials (e.g., authentication credentials that will be recognized as invalid by the legacy application) based on the randomized string. In some embodiments, the algorithm may further be configured to perform one or more validation checks based on various types of information associated with the user, account, and/or the login attempt (e.g., correct username provided, system time data, host information, or the like).

The local authentication agent may then be configured to pass the set of invalid authentication credentials to the application instead of the valid authentication credentials received from the user, which will in turn cause the authentication of the user to fail (e.g., the legacy application may present an error message on a user interface indicating that the authentication credentials are invalid). It should be noted that even though the user may have provided valid authentication credentials, the local authentication agent may cause the authentication attempt to fail by providing the generated set of invalid authentication credentials to the user. This process may be repeated one or more times depending on the configuration of the authentication agent before the authentication agent passes on the valid set of authentication credentials to the application.

Continuing the example, the local authentication agent may be configured to generate two sets of invalid authentication credentials over two login attempts before finally passing the valid authentication credentials to the application on the third attempt. In such an embodiment, the local authentication agent may generate a first set of invalid authentication credentials from a first randomized string and a second set of invalid authentication credentials from a second randomized string. Meanwhile, a backend authentication agent may also independently generate its own sets of invalid authentication credentials based on the same pre-shared keys and/or algorithms from the same random strings. Accordingly, the backend authentication agent may be aware of the exact values of each of the sets of invalid authentication credentials. By comparing the sets of invalid authentication credentials generated by the backend authentication agent with the sets of invalid authentication credentials generated by the local authentication agent, the backend authentication agent may be able to determine whether the "correct" invalid authentication credentials were provided by the application. If the backend authentication agent detects a match, the backend authentication agent may trigger an authentication pass to allow the local authentication agent to pass the valid authentication credentials to the application to allow authorized access.

To further illustrate using the above example, the backend authentication agent, like the local authentication agent, may generate a first set of invalid authentication credentials based on the first randomized string and a second set of invalid authentication credentials based on the second randomized string. The backend authentication agent may then compare the first set of invalid authentication credentials generated by the backend authentication agent with the first set of invalid authentication credentials generated by the local authentication agent. The backend authentication agent may further compare the second set of invalid authentication credentials generated by the backend authentication agent with the second set of invalid authentication credentials generated by the local authentication agent. Upon detecting a match, the backend authentication agent may trigger an authentication pass which causes the local authentication agent to pass the next set of authentication credentials from the user to the legacy application. Accordingly, if the user has provided a valid set of authentication credentials, the system may allow the legacy application to authenticate and authorize the user. In this way, the system effectively requires that correct login credentials are provided over three total login attempts. If a mismatch is detected at any stage, the system may prevent the user from being authenticated (e.g., by withholding the valid authentication credential from the legacy application). In other words, the "true" set of authentication credentials that ultimately grants authorized access to the application comprises, in order, the first set of authentication credentials, the second set of authentication credentials, and the user-provided set of authentication credentials, which is significantly more complex than the user-provided set of credentials in isolation.

It should be noted that the authentication process as described above may not be visible to the user. Continuing the above example, even if the user enters the correct username and password for all three login attempts, the system may cause the first two login attempts to fail and the third login attempt to succeed. Accordingly, to the user and/or potentially unauthorized observers, the same authentication credentials may outwardly appear to produce different results in accessing the legacy application, which in turn helps obfuscate the actual login transaction.

That said, it is within the scope of the disclosure for the user to input the sets of invalid authentication credentials. Accordingly, in some embodiments, the user may read the output of the pre-shared algorithm (which may be generated by the user computing system which hosts the legacy application and/or another device, such as a mobile phone) and enter the invalid authentication credentials into the login fields of the legacy application. A local agent may then separately calculate the values for the sets of invalid authentication credentials. If the sets of invalid authentication credentials received from the user match the sets of invalid authentication credentials calculated by the local agent, the local agent may then trigger an authentication pass which may cause the next set of authentication credentials received from the user to be passed to the legacy application.

The system as described herein confers a number of technological advantages over conventional authentication systems. In particular, using the authentication process as described herein, the system may provide a way to extend authentication complexity requirements to legacy applications that do not natively support such requirements. Accordingly, the system avoids the need to rewrite, replace, or extensively modify legacy applications to implement such complexity requirements. Furthermore, by obfuscating the underlying authentication transaction, the system provides a way to deter unauthorized users and/or applications from successfully gaining authorized access Turning now to the figures, FIG. 1 illustrates an operating environment 100 for the authentication requirement extension system, in accordance with one embodiment of the present disclosure. In particular, FIG. 1 illustrates a user computing device 101 that is operatively coupled, via a network, to a backend authentication computing system 102. In such a configuration, the user computing device 101 may transmit information to and/or receive information from the backend authentication computing system 102. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, in some embodiments, the functions of the various authentication agents may be executed on a single device (e.g., the user computing device 101). Furthermore, a single system, device, or server as depicted in FIG. 1 may represent multiple systems, devices, or servers. For instance, though the backend authentication computing system 102 is depicted as a single unit, the operating environment 100 may comprise multiple systems that may perform backend authentication processes with respect to the various applications and/or users within the network environment.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the user computing device 101 may be a computing system that may host one or more applications that may grant authorized access to certain data, systems, applications, or other types of computing resources within the network environment. In this regard, the user computing device 101 may be a computing system that may be operated by a user 104, such as a desktop computer, laptop computer, smartphone or smart device, single board computer, IoT device, or the like, which may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

Accordingly, the user computing device 101 may comprise a processing device 114 operatively coupled to a communication device 112 and a memory device 116 having data storage 118 and computer readable instructions 120 stored thereon. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 is operatively coupled to the communication device 112 and the memory device 116. The processing device 114 uses the communication device 112 to communicate with the network and other devices on the network, such as, but not limited to the backend authentication computing system 102. The communication device 112 generally comprises a modem, antennae, Wi-Fi or Ethernet adapter, radio transceiver, or other device for communicating with other devices on the network.

In some embodiments, the memory device 116 includes data storage 118 for storing data related to the system environment. In this regard, the data storage 118 may comprise various types of information that may be relevant to the authentication process, such as shared cryptographic keys and/or values. The memory device 116 may further have computer-readable instructions 120 stored thereon, which in one embodiment includes computer-readable instructions of a user application 122. The user application 122 may be an application with which the user 104 may interact to perform certain functions related to the entity's and/or the user's objectives. For instance, in some embodiments, the user application 122 may be a legacy account management application through which the user may view and/or edit certain details regarding a user account associated with the user. Accordingly, the user 104 may provide authentication credentials to the user application 122 through the user interface of the user computing device 101. The computer readable instructions 120 may further comprise a local authentication agent 124, which may contain executable portions for performing the multifactor authentication and credential complexity augmentation functions as described herein. In particular, the local authentication agent 124 may receive be configured to read one or more randomized strings associated with a particular login transaction and generate from the randomized strings one or more invalid authentication credentials to be provided to the user application 122. The local authentication agent 124 may continue to generate invalid authentication credentials until an authentication pass has been triggered based on the pre-designated invalid authentication credentials being entered into the user application 122. In this regard, the local authentication agent 124 may, in some embodiments, be an integrated part of the user application 122.

As further illustrated in FIG. 1, the operating environment 100 may further comprise a backend authentication computing system 102 in operative communication with the user computing device 101. In some embodiments, the backend authentication computing system 102 may be a computing system that may perform backend authentication processes to grant authorized access to certain applications, data, or other resources based on successful authentication of the user. Accordingly, the backend authentication computing system 102 may be a server or networked terminal, though it is within the scope of the disclosure for the backend authentication computing system 102 to be any other type of computing system as disclosed herein.

The backend authentication computing system 102 may comprise a processing device 134 operatively coupled to a communication device 132 and a memory device 136 having data storage 138 and computer readable instructions 140 stored thereon, where the computer readable instructions 140 may include a backend authentication agent 142. The backend authentication agent 142 may be configured to calculate sets of invalid authentication credentials based on the same pre-shared keys and/or algorithms along with the same input values (e.g., the randomized strings) as those of the local authentication agent 124. The backend authentication agent 142 may then compare its own invalid authentication credentials with the invalid authentication credentials generated by the local authentication agent 124. If a match is detected, the system may (e.g., via the backend authentication agent 142), cause an authentication pass to be triggered which may cause the local authentication agent 124 to pass the valid authentication credentials from the user 104 to the user application 122. If no match is detected, the system may decline to trigger the authentication pass.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory"

may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 illustrates a process flow 200 increasing authentication credential complexity using generated invalid login credentials, in accordance with some embodiments. The process begins at block 201, where the system detects one or more authentication requests from a user, the one or more authentication requests comprising a set of valid authentication credentials associated with a user application. In an exemplary embodiment, the user application may be an account management application that may require the user to enter login credentials in order to perform certain account management functions. In particular, the user application may be an application that does not support certain authentication credential complexity requirements (e.g., a legacy application which only supports user passwords of a certain length). Accordingly, the user may submit an authentication request (or a series of authentication requests) comprising a valid set of authentication credentials (e.g., a username and password), where the authentication request may be a login attempt with respect to the user application. In some embodiments, the authentication request may further comprise other types of data and/or metadata regarding the authentication request/transaction, such as time of day, host information (e.g., information about the hardware and/or software configuration of the user computing system), or the like. As will be described in further detail below, the user may be required to submit multiple authentication requests with valid authentication credentials before being authorized to access the user application.

The process continues to block 202, where the system, based on the one or more authentication requests, generate one or more randomized strings associated with the one or more authentication requests. In this regard, a randomized string (e.g., a fixed-length string of numbers or other characters) may be generated for each authentication request submitted by the user. In some embodiments, the randomized string may be embedded as a header within each authentication request such that the header is not visible to the user. In such embodiments, the system may process the randomized string automatically to further the authentication process, as will be described in further detail below. In other embodiments, the randomized string may be displayed to the user (e.g., via a display device of the user computing system and/or another computing device being operated by the user) such that the user may use the randomized string as part of the login attempt.

The process continues to block 203, where the system generates, by a local authentication agent using the one or more randomized strings and a pre-shared algorithm, one or more sets of invalid authentication credentials. The local authentication agent may be, for instance, a set of executable code that is integrated into the user application which may control the authentication process. In particular, the local authentication agent may input a randomized string into the pre-shared algorithm to generate a set of invalid authentication credentials (e.g., a username and password that causes authentication to fail). In this regard, the local authentication agent may compare the set of valid authentication credentials received from the user with the generated set of invalid authentication credentials to ensure that the two do not match. If multiple authentication requests are received, then the system may generate a set of invalid authentication credentials for each of the multiple authentication requests until the authentication condition has been satisfied and an authentication pass is triggered.

The process continues to block 204, where the system inputs the one or more sets of invalid authentication credentials to the user application. In this regard, rather than passing on the valid authentication credentials received from the user, the system may input the invalid authentication credentials into the user application as part of the authentication process. As expected, the user application may return an error to the user (e.g., via a graphical interface presented on a display of the user computing system) that the authentication credentials are invalid (e.g., "your username and/or password are incorrect"). It should be noted that to the user, it may appear that the user has received the error even though the user has entered the correct authentication credentials. In turn, this would also appear to be the case to any potential unauthorized user that may be monitoring the user and/or the user computing system (e.g., using unauthorized applications such as sniffer software or the like).

The process continues to block 205, where the system receives, through a backend authentication agent, the one or more sets of invalid authentication credentials from the user application. The backend authentication agent may be a backend set of code and/or application that may further control the authentication process. In this regard, the backend authentication agent may continuously monitor the authentication credentials being transmitted to the user application and/or backend authentication systems.

The process continues to block 206, where the system generates, by the backend authentication agent using the one or more randomized strings and the pre-shared algorithm, one or more backend copies of the one or more sets of invalid authentication credentials. In this regard, the backend authentication agent may use the same inputs (e.g., the randomized string) with the same pre-shared algorithm as the ones used by the local authentication agent to calculate its own sets of invalid authentication credentials. In this way, the backend authentication agent is able to determine the expected values for the invalid authentication credentials being transmitted through the user application (e.g., as provided by the local authentication agent). Specifically, the backend authentication agent may determine whether the invalid authentication credentials that is has generated match the invalid authentication credentials provided to the user application.

The process continues to block 207, where the system performs authentication of the user based on comparing the one or more sets of invalid authentication credentials with the one or more backend copies of the one or more sets of invalid authentication credentials. The authentication of the user may proceed in different ways depending on whether there is a match between the sets of invalid authentication credentials calculated separately by the local authentication agent and the backend authentication agent. In this regard, the backend authentication agent may be configured to cause an authentication pass to be triggered, where the authentication pass causes the local authentication agent to pass on the true, valid authentication credentials from the user to the user application, thereby granting authorized access to the user.

In some embodiments, the system may require that a designated number of authentication requests are made before the authentication pass is triggered. For instance, the system may be configured that two sets of invalid authentication credentials are successfully generated and provided to the user application before the authentication pass is triggered. In such embodiments, the backend authentication agent may perform its own calculations (e.g., via the pre-shared algorithm) and validate the first set of invalid authentication credentials and the second set of invalid authentication credentials received through the user application. In other words, the backend authentication agent may require that values for both sets of invalid authentication credentials match the expected values as calculated by the backend authentication agent. In this way, the first set of invalid authentication credentials, in combination with the second set of invalid authentication credentials, form at least a portion of the passphrase that allows the authentication process to proceed. If the backend authentication agent detects that either of the sets of invalid authentication credentials do not match expected values, the backend authentication agent may be configured not to trigger the authentication pass, which in turn will cause the authentication process to fail indefinitely until the expected sets of invalid authentication credentials are provided.

Once all required sets of invalid authentication credentials have been validated by the backend authentication agent, the backend authentication agent may trigger an authentication pass, which in turn comprises instructions for the local authentication agent to allow the valid authentication credentials to be passed to the user application. In this example, all of the required sets of invalid authentication credentials must match expected values as determined by a pre-shared key/algorithm, and valid authentication credentials must be provided to the legacy application in order to successfully gain authorized access to the user application. In this way, the system may provide a way to provide extended authentication complexity functions to applications that may not natively support such functions.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for increasing authentication complexity for access to online systems, the system comprising a backend authentication system device comprising:
    a first memory device with first computer-readable program code stored thereon;
    a first communication device; and
    a first processing device operatively coupled to the first memory device and the first communication device,
    wherein the system further comprises a user computing device comprising:
    a second memory device with second computer-readable program code stored thereon;
    a second communication device; and
    a second processing device operatively coupled to the second memory device and the second communication device,
    wherein the first processing device of the backend authentication system device is configured to execute the first computer-readable program code to:
        detect a sequence of authentication requests from a user, wherein the sequence of authentication requests comprises a series of login attempts, wherein each login attempt is associated with a set of authentication credentials within one or more sets of authentication credentials associated with a user application, the one or more sets of authentication credentials comprising one or more sets of invalid authentication credentials and a set of valid authentication credentials;
        based on the one or more authentication requests, generate one or more randomized strings associated with the one or more authentication requests;
        receive, through a backend authentication agent, the one or more sets of invalid authentication credentials from the user application;
        generate, by the backend authentication agent using the one or more randomized strings and a pre-shared algorithm, one or more backend copies of the one or more sets of invalid authentication credentials; and
        perform authentication of the user based on the sequence of authentication requests, wherein performing authentication comprises evaluating a match between 1) the one or more sets of invalid authentication credentials with the one or more backend copies of the one or more sets of invalid authentication credentials; and 2) the set of valid authentication credentials with an expected value for the set of valid authentication credentials,
    wherein the second processing device of the user computing device is configured to execute the second computer-readable program code to:
        generate, by a local authentication agent using the one or more randomized strings and the pre-shared algorithm, the one or more sets of invalid authentication credentials;
        input the one or more sets of invalid authentication credentials to the user application.

2. The system according to claim 1, wherein performing authentication of the user comprises:
    detecting that the one or more sets of invalid authentication credentials match the one or more backend copies of the one or more sets of invalid authentication credentials; and
    triggering an authentication pass, wherein the authentication pass causes the local authentication agent to pass the set of valid authentication credentials to the user application.

3. The system according to claim 1, wherein performing authentication of the user comprises:
    detecting that the one or more sets of invalid authentication credentials do not match the one or more backend copies of the one or more sets of invalid authentication credentials; and
    preventing an authentication pass from being triggered.

4. The system according to claim 1, wherein the one or more sets of invalid authentication credentials comprises a first set of invalid authentication credentials and a second set of invalid authentication credentials, wherein the one or more backend copies of the one or more sets of invalid authentication credentials comprises a backend copy of the first set of invalid authentication credentials and a backend copy of the second set of invalid authentication credentials, wherein performing authentication of the user comprises:
  detecting that the first set of invalid authentication credentials matches the backend copy of the first set of invalid authentication credentials;
  detecting that the second set of invalid authentication credentials matches the backend copy of the second set of invalid authentication credentials; and
  triggering an authentication pass, wherein the authentication pass causes the local authentication agent to pass the set of valid authentication credentials to the user application.

5. The system according to claim 1, wherein the local authentication agent is integrated into the user application.

6. The system according to claim 1, wherein the one or more randomized strings are embedded in header information of the one or more authentication requests.

7. The system according to claim 1, wherein the set of valid authentication credentials comprises a username and password.

8. A computer program product for increasing authentication complexity for access to online systems, the computer program product comprising at least one non-transitory computer readable medium having computer-readable program code portions embodied therein, the computer-readable program code portions comprising executable code portions for:
  detecting a sequence of authentication requests from a user, wherein the sequence of authentication requests comprises a series of login attempts, wherein each login attempt is associated with a set of authentication credentials within one or more sets of authentication credentials associated with a user application, the one or more sets of authentication credentials comprising one or more sets of invalid authentication credentials and a set of valid authentication credentials;
  based on the one or more authentication requests, generating one or more randomized strings associated with the one or more authentication requests;
  generating, by a local authentication agent using the one or more randomized strings and a pre-shared algorithm, one or more sets of invalid authentication credentials;
  inputting the one or more sets of invalid authentication credentials to the user application;
  receiving, through a backend authentication agent, the one or more sets of invalid authentication credentials from the user application;
  generating, by the backend authentication agent using the one or more randomized strings and the pre-shared algorithm, one or more backend copies of the one or more sets of invalid authentication credentials; and
  performing authentication of the user based on the sequence of authentication requests, wherein performing authentication comprises evaluating a match between 1) the one or more sets of invalid authentication credentials with the one or more backend copies of the one or more sets of invalid authentication credentials; and 2) the set of valid authentication credentials with an expected value for the set of valid authentication credentials.

9. The computer program product according to claim 8, wherein performing authentication of the user comprises:
  detecting that the one or more sets of invalid authentication credentials match the one or more backend copies of the one or more sets of invalid authentication credentials; and
  triggering an authentication pass, wherein the authentication pass causes the local authentication agent to pass the set of valid authentication credentials to the user application.

10. The computer program product according to claim 8, wherein performing authentication of the user comprises:
  detecting that the one or more sets of invalid authentication credentials do not match the one or more backend copies of the one or more sets of invalid authentication credentials; and
  preventing an authentication pass from being triggered.

11. The computer program product according to claim 8, wherein the one or more sets of invalid authentication credentials comprises a first set of invalid authentication credentials and a second set of invalid authentication credentials, wherein the one or more backend copies of the one or more sets of invalid authentication credentials comprises a backend copy of the first set of invalid authentication credentials and a backend copy of the second set of invalid authentication credentials, wherein performing authentication of the user comprises:
  detecting that the first set of invalid authentication credentials matches the backend copy of the first set of invalid authentication credentials;
  detecting that the second set of invalid authentication credentials matches the backend copy of the second set of invalid authentication credentials; and
  triggering an authentication pass, wherein the authentication pass causes the local authentication agent to pass the set of valid authentication credentials to the user application.

12. The computer program product according to claim 8, wherein the local authentication agent is integrated into the user application.

13. The computer program product according to claim 8, wherein the one or more randomized strings are embedded in header information of the one or more authentication requests.

14. A computer-implemented method for increasing authentication complexity for access to online systems, wherein the computer-implemented method comprises:
  detecting a sequence of authentication requests from a user, wherein the sequence of authentication requests comprises a series of login attempts, wherein each login attempt is associated with a set of authentication credentials within one or more sets of authentication credentials associated with a user application, the one or more sets of authentication credentials comprising one or more sets of invalid authentication credentials and a set of valid authentication credentials;
  based on the one or more authentication requests, generating one or more randomized strings associated with the one or more authentication requests;
  generating, by a local authentication agent using the one or more randomized strings and a pre-shared algorithm, one or more sets of invalid authentication credentials;
  inputting the one or more sets of invalid authentication credentials to the user application;
  receiving, through a backend authentication agent, the one or more sets of invalid authentication credentials from the user application;

generating, by the backend authentication agent using the one or more randomized strings and the pre-shared algorithm, one or more backend copies of the one or more sets of invalid authentication credentials; and performing authentication of the user based on the sequence of authentication requests, wherein performing authentication comprises evaluating a match between 1) the one or more sets of invalid authentication credentials with the one or more backend copies of the one or more sets of invalid authentication credentials; and 2) the set of valid authentication credentials with an expected value for the set of valid authentication credentials.

15. The computer-implemented method according to claim 14, wherein performing authentication of the user comprises:

detecting that the one or more sets of invalid authentication credentials match the one or more backend copies of the one or more sets of invalid authentication credentials; and triggering an authentication pass, wherein the authentication pass causes the local authentication agent to pass the set of valid authentication credentials to the user application.

16. The computer-implemented method according to claim 14, wherein performing authentication of the user comprises:

detecting that the one or more sets of invalid authentication credentials do not match the one or more backend copies of the one or more sets of invalid authentication credentials; and preventing an authentication pass from being triggered.

17. The computer-implemented method according to claim 14, wherein the one or more sets of invalid authentication credentials comprises a first set of invalid authentication credentials and a second set of invalid authentication credentials, wherein the one or more backend copies of the one or more sets of invalid authentication credentials comprises a backend copy of the first set of invalid authentication credentials and a backend copy of the second set of invalid authentication credentials, wherein performing authentication of the user comprises:

detecting that the first set of invalid authentication credentials matches the backend copy of the first set of invalid authentication credentials;

detecting that the second set of invalid authentication credentials matches the backend copy of the second set of invalid authentication credentials; and triggering an authentication pass, wherein the authentication pass causes the local authentication agent to pass the set of valid authentication credentials to the user application.

18. The computer-implemented method according to claim 14, wherein the local authentication agent is integrated into the user application.

19. The computer-implemented method according to claim 14, wherein the one or more randomized strings are embedded in header information of the one or more authentication requests.

20. The computer-implemented method according to claim 14, wherein the set of valid authentication credentials comprises a username and password.

* * * * *